United States Patent [19]

Pinto et al.

[11] 4,215,099

[45] Jul. 29, 1980

[54] AMMONIA SYNTHESIS PROCESS

[75] Inventors: Alwyn Pinto; Stanley A. Ward, both of Stockton-on-Tees, England

[73] Assignee: Imperial Chemical Industries Limited, London, England

[21] Appl. No.: 849,359

[22] Filed: Nov. 7, 1977

[30] Foreign Application Priority Data

Nov. 15, 1976 [GB] United Kingdom ............... 47450/76

[51] Int. Cl.² ............................................. C01C 1/04
[52] U.S. Cl. ..................................... 423/360; 423/361
[58] Field of Search ............................... 423/359–363; 23/288 K, 288 L, 289

[56] References Cited

U.S. PATENT DOCUMENTS

| | | | |
|---|---|---|---|
| 1,660,511 | 2/1928 | Jaeger | 260/684 |
| 2,910,350 | 10/1959 | Jean | 23/289 |
| 3,031,274 | 4/1962 | Schober | 23/289 |
| 3,395,982 | 8/1968 | Didycz | 423/360 |
| 3,420,630 | 1/1969 | Braun | 423/361 |
| 3,441,393 | 4/1969 | Finneran et al. | 423/359 |
| 3,475,137 | 10/1969 | Kuo et al. | 423/360 |
| 3,721,532 | 3/1973 | Wright | 423/361 |
| 3,825,501 | 7/1974 | Muenger | 23/288 L |
| 3,998,932 | 12/1976 | Collina et al. | 423/360 |

FOREIGN PATENT DOCUMENTS 1217934  6/1966  Fed. Rep. of Germany ........... 423/361

*Primary Examiner*—Wayne A. Langel
*Attorney, Agent, or Firm*—Cushman, Darby & Cushman

[57] ABSTRACT

An exothermic gas phase reaction, especially synthesis of ammonia or methanol, is carried out by passing the reactant gas over a catalyst in a first zone in heat exchange with a coolant and then in a second, adiabatic zone and then passing reacted gas directly to a heat recovery zone. Such a sequence of zones affords a higher output of product and better heat recovery than in many previously used sequences, especially when the heat available from the cooled zone is used to pre-heat reactant gas and the heat removed from the gas leaving the adiabatic zone is used in high-grade recoveries such as high pressure steam generation.

6 Claims, 3 Drawing Figures

AMMONIA SYNTHESIS PROCESS

This invention relates to an exothermic gas-phase catalytic hydrogenation process, especially the synthesis of ammonia or the various syntheses starting from carbon oxides and hydrogen, and to a reactor and plant in which such a process can be carried out with good efficiency.

In such processes the heat of reaction has to be absorbed or removed in a manner that avoids excessive temperatures that would cause damage to the catalyst or apparatus and/or would result in low conversion due to unfavourable chemical equilibrium, yet keeps the temperature high enough to permit rapid reaction. Methods of temperature limitation have included injection of cold gas into the catalyst bed or into spaces between parts of a catalyst bed, cooling by indirect heat exchange with incoming cold gas and/or by a circulated coolant and combinations of such measures. It has been proposed also to use the combination of an adiabatic catalyst bed with a subsequent cooled bed, for example in U.S. Pat. No. 1,909,378 and U.K. Pat. No. 1,356,151, or a pair of adiabatic beds separated by a gas-cooled heat exchanger, for example in Nitrogen No. 101 May-June 1976, 42-43.

We have now devised a process capable of operation with less degradation of heat and more effective use of the space in the catalytic reactor, yet with also simplicity of reactor construction and operation. We believe that the reactor in which we prefer to carry out our process is also new. Our process and reactor are based on the principles that (a) reaction takes place partly in an externally cooled bed, which can be controlled to maintain the maximum reaction rate and (b) that the product of reactions in such conditions is then reacted in an adiabatic catalyst bed large enough to permit a relatively close approach to equilibrium despite the decreasing reaction rate as equilibrium is approached. When the cooled bed is cooled by heat exchange with feed gas, our process can provide a simple solution to the problem of achieving both high-grade heat recovery and effective feed gas preheating, in that the heat supplies for these purposes are derived from distinct zones of the reaction.

According to the invention an exothermic gas-phase reaction is carried out by passing a reactant gas mixture over a catalyst for the process in a first zone in heat-exchange with a coolant, then over a catalyst for the process in an adiabatic zone, then through a heat-recovery zone, without chemical reaction or heat recovery between the said zones.

By the use of this succession of zones it is possible to make very effective use of the catalyst, because the reaction is favoured by removal of heat in the first zone and, after much of the reactant has reacted in the first zone, is favoured by the large catalyst volume that can be economically provided in the second zone. In a preferred form of the process the reaction rate in the first zone is maximised by controlling the temperature in that zone at a level at which the reaction rate is either (a) at or within 50% of the maximum possible rate for the reaction mixture used or (b) at least 50% of the maximum allowable using the catalysts whichever is the lower. For example, in ammonia synthesis over an iron catalyst, the maximum reaction rate can usually be used without harming the catalyst; in methanol synthesis over a copper-containing catalyst, however, the temperature should be under 300° C., preferably under 280° C., and therefore the maximum temperature within this range is preferably used. In methane synthesis a variety of catalysts is available, some but not all of which will withstand maximum rate temperatures up to about 700° C.; and consequently either basis on which to choose the first zone temperature may be appropriate.

In the first zone the temperature is preferably controlled so as to fall towards the outlet, because the maximum rate temperature is lower the higher the proportion of product present in the reacting gas. The temperature, if it deviates from the maximum rate temperature, preferably falls below it towards the end of the first zone.

The coolant applied to the first zone is preferably the gas to be fed as reactant to the first zone, or part of that gas. This avoids the complication of a separate system for circulating a liquid, such as water under pressure or molten metal or diphenyloxide/diphenyl in heat exchange with the first zone. It also avoids the need for a feed/effluent heat exchanger as commonly used in synthesis processes, and thus enables a greater proportion of the synthesis reactor volume to contain catalyst.

The first zone is preferably within a plurality of tubes. In this respect it differs from previous common practice in ammonia synthesis, in which temperature control of the catalyst bed has been by means of gas-circulation tubes within the catalyst bed. Although the catalyst has been disposed within the tubes in some methanol synthesis reactors, cooling by feed gas does not appear to have been practised on an industrial scale. By having the catalyst within the tubes it becomes possible to feed coolant to the space exterior to the tubes at several points and to control its flow by baffles, in order to obtain the most favourable temperature distribution within the tubes.

The coolant flow can be co-current or counter-current or in a combination thereof, such as convergent or divergent flow. Co-current flow is especially desirable in methanation to SNG when the starting gas contains 8-25% v/v of methanatable hydrogen. Counter current flow is suitable for ammonia synthesis. The flow pattern can be changed appropriately to take account of the gradual loss of catalytic activity that normally occurs in long periods of operation.

In addition to the preferred fall in temperature as the first zone reaction proceeds, it is preferred to have a substantial rise in temperature at or just before the inlet of the first zone, that is, to feed gas to catalyst at the lowest temperature practicable. This maximises the quantity of exothermic reaction heat taken up as sensible heat, and thus also the quantity of product formed before abstraction of heat has to be started. The rise in temperature can be attained by suitable adjustment of the coolant flow, including by-passing some of the feed gas. If desired, an adiabatic pre-zone can be used in order to produce the temperature rise, and is desirable if the purity of the synthesis gas is inadequate, because it protects the catalyst in the cooled zone from poisoning.

The adiabatic zone suitably has a volume 0.5 to 5.0 especially 0.8 to 3 times that of the catalyst in the first zone. The flow in the adiabatic bed can be radial or chordal but is preferably axial (in a cylindrical reactor), since this enables the residence time of the gas in this zone to be as long as possible.

On leaving the adiabatic zone the gas is hot and can be passed to high grade heat recovery, for example a boiler producing steam at over 30, especially 60-120 atm. abs. pressure, or possibly a boiler feed water heater, depending on the temperature. When the first zone coolant is feed gas, it can be heat-exchanged with adiabatic zone effluent gas after the high grade heat recovery to give the warm gas suitable for use as coolant. Further heat exchange is usually necessary to cool the gas sufficiently for further processing, for example to 90°–130° C. for separation of water and removal of carbon dioxide (in a methane-producing process), to 30°–50° for condensation of methanol, to 20°–40° C. for partial condensation of ammonia or to −30° to +20° for subatantially complete condensation of ammonia.

After such low-temperature processing, there is usually a separated gas phase which can be recycled to the synthesis to effect further conversion or to assist in controlling the temperature.

The invention is especially applicable to ammonia synthesis. In such a synthesis the pressure is typically in the range 100–500 atm. abs., especially up to 250 atm. abs. The strike temperature of the catalyst is typically in the range 300°–400° C. and the reacting gas enters the catalyst conveniently at a temperature in the range 350°–430° C. In the first zone the highest temperature reached is preferably less by 20°–80° C. than the equilibrium level, that is, the level that would be reached if the gas flow rate were slow enough and thus the residence time long enough to allow equilibrium to be reached. The maximum reaction rate temperature depends on the gas composition, especially on the ammonia content, and is typically in the range 540°–580° C. at 3% ammonia, 400°–450° C. at 20% ammonia and at corresponding levels between the outside these ammonia contents; the plot of maximum rate temperature against ammonia content is not linear, but is close enough to linear to provide a general guide as to the temperatures required. The outlet temperature of the stage operate in heat exchange is preferably under 400° C. The outlet temperature of the adiabatic bed is preferably over 400° C. for example in the range 420°–480° C., and this is high enough to raise steam at over 30 especially in the range 40–120 atm. abs. in a waste heat boiler fed by the gas leaving the adiabatic bed. As an alternative, the heat recovery from the gas leaving the adiabatic bed can be by boiler feed water heating.

The invention is applicable also the synthesis of methanol at an outlet temperature under 300° C. over a copper-containing catalyst. The strike temperature of the catalyst is typically over 160° C., especially over 190° C., and the reactant gas enters the catalyst conveniently at between 200° and 240° C. Using the normal high-activity catalyst the temperature rises preferably to 260°–280° C. before or just inside the first zone. The gas feeding the first zone can have been the coolant for that zone; in this event the gas leaving the adiabatic zone can be passed entirely to the highest-grade heat recovery possible, that is, steam raising at up to 40 atm. abs. or boiler feed water heating or purge-gas superheating before let-down in a power-recovery engine. Processes to which the invention is applicable are described in U.K. specification Nos. 1,159,035, 1,484,366 and 1,484,367.

Other processes to which the invention is applicable include the production of methane, especially as described in U.K. specification No. 1,413,287, and methanol synthesis over a zinc-chrome catalyst at 300°–400° C., 150–450 atm. abs. pressure.

The invention also provides a plant for carrying out the process, which plant is characterised by including the combination of a first heat exchanger having a catalyst bed on one side of its heat exchange surface, a catalyst container substantially insulated against gain or loss of heat and a heat recovery heat exchanger, with means to feed reactant gas into the catalyst bed, from the catalyst bed directly into the catalyst container and from the catalyst container directly into the heat recovery heat exchanger and with means to feed coolant to the other side of the first heat exchanger.

Consistent with the process, the plant preferably includes flow communication from the said other side of the first heat exchanger to the inlet of the catalyst bed, which is preferably within a plurality of tubes. In order to provide the preferred initial rise in temperature there can be a substantially adiabatic catalyst bed immediately upstream of the catalyst bed in the heat exchanger. The heat recovery heat exchanger is preferably a boiler in an ammonia synthesis plant or a boiler feed water heater in a low temperature methanol synthesis plant. The feed gas used as coolant for the catalyst bed in the first heat exchanger has preferably been warmed by heat exchange with gas leaving the heat recovery heat exchanger and accordingly the plant includes preferably such a gas-warming heat exchanger.

The invention provides the plant in combination with other integers appropriate to one or more of the preferred features of the process, and also such a plant in combination with one or more processes of synthesis gas generation by reacting a carbonaceous fuel with oxygen and/or steam, converting carbon monoxide with steam to give carbon dioxide and hydrogen and, where appropriate, removing carbon dioxide and steam.

The invention provides further a reactor characterised by the above-mentioned plant and process features, essential and, where appropriate, preferred.

The reactor preferably contains no heat exchanger other than that providing heat exchange for cooling the first zone.

The interior construction of the reactor can follow the principles established for the construction of synthesis reactors. In particular, when the reacting gas temperature is to be over 300° C., the outer shell of the reactor is kept cool, for example under 200° C., by disposing at least the adiabatic catalyst bed in a "cartridge", that is, an interior vessel spaced from the outer shell, and feeding cool gas through the space between the cartridge and the shell before it enters the catalyst or contacts the heat exchange surfaces of the cooled zone. For this purpose the reactor shell preferably has a cool gas feed port at each end, so that the cool gas flows convergently towards the gas inlet of the cold side of the heat exchanger constituting the first catalyst zone. As an alternative to the use of a cartridge, the reactor shell can be lined with refractory concrete and a water-jacket applied to its exterior. For a process at under 300° C., such as methanol synthesis over a copper-containing catalyst, the reacting gases can be allowed into contact with the outer shell.

The gas flow in the adiabatic zone can be radially through the catalyst but is preferably axial, in order to afford a longer contact time.

Preferred forms of the invention are described more fully with respect to the following drawings, in which.

Figure 1:
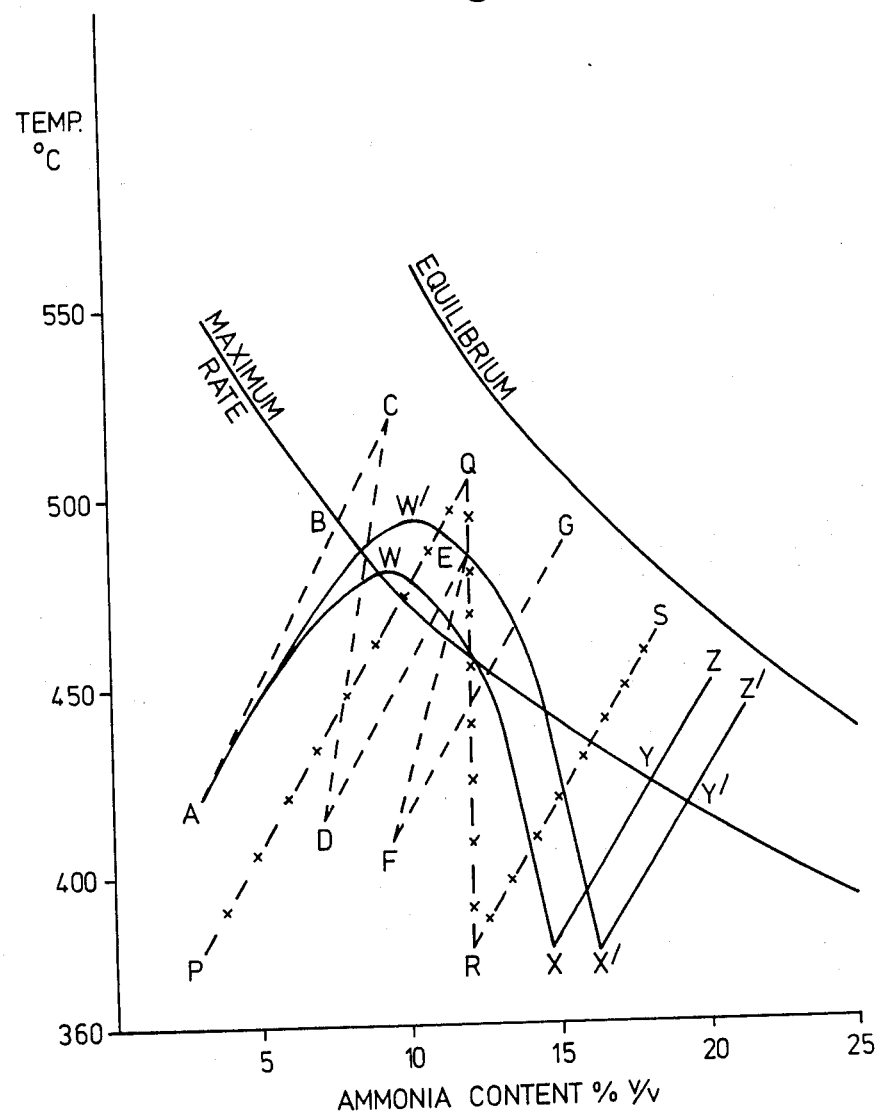
FIG. 1 shows the variation of ammonia content with reaction temperature in an ammonia synthesis process according to the invention.

The diagram shown in FIG. 1 is a graph in which ammonia concentration is plotted as abscissa against temperature as ordinate. The line marked "equilibrium" joins the concentrations of ammonia that would be present if the feed gas were allowed to come fully to equilibrium at various temperatures. The position of this line depends on the composition of the feed gas which, for the diagram shown was, in volume percentages:
$N_2$: 20.875
$H_2$: 62.625
$CH_4$+noble gases: 13.5
$NH_3$: 3.0

Since the rate of reaction to form ammonia is balanced by the reverse reaction at equilibrium, the rate of reaction becomes slower as equilibrium is approached, despite the high temperature. On the other hand, the rate of reaction also becomes slower the lower the temperature, despite the ample availability of reactable nitrogen and hydrogen. At an intermediate temperature the reaction rate is a maximum. The line marked "maximum rate" joins the temperature at which mixtures having various ammonia concentrations react at the highest rate.

If a particular starting reaction mixture at a particular temperature—for example at point A, representing 3% $NH_3$ in a gas at 420° C.—is allowed to react adiabatically, its temperature will rise from the starting temperature as ammonia is formed in it. The plot A-B-C of temperature against ammonia concentration is approximately linear because the heat of reaction does not change much with temperature and the specific heat of the 2 product molecules of ammonia is not very different from that of the 4 reactant molecules $N_2+3H_2$. If a quench reactor is used, the addition of quench gas containing only 3% of ammonia decreases the ammonia concentration from 8.5% at point C to 7% at point D and decreases the temperature to 411° C. The quenched gas then reacts adiabatically from point D to point E, is quenched from point E to point F and finally reacted adiabatically from point F to point G, 488° C., 15% ammonia. It would be possible to introduce further quenches and adiabatic stages, which would be represented by further zig-zag lines straddling the maximum rate line, but this is usually considered undesirable because of mechanical complication.

The same type of plot can be made for a reactor with indirect cooling. A gas mixture (point P) at 380° C. containing 3% of ammonia, when allowed to react adiabatically becomes heated and changes to point Q. (The inlet temperature has been shown as 380° C. in order to avoid confusion with the quench reactor lines). From point Q the line falls vertically to point R because with indirect heat exchange the temperature falls without any change in the gas composition. From point R the temperature and ammonia content rise by adiabatic reaction to point S Point S is to the right of point G because of the lower starting temperature at P compared with point A; this lower temperature means that a larger catalyst bed is needed for the P to Q reaction than for the A to B reaction. After the mixture has reached point S, it could be cooled once more and allowed to react adiabatically. Since, however, the Q to R cooling was by means of a heat exchanger inside the reactor, it would evidently be expensive to have such a further stage of cooling and reaction.

In the process according to the invention, taking point A as an example of a starting gas mixture and temperature, whereas, if reaction were adiabatic, point B (at which the reaction rate is a maximum) and then point C (above its maximum rate) would be reached, in heat exchange with a coolant the temperature and ammonia content rise to point W or point W', depending on the intensity of cooling adopted. Since heat is being removed by indirect heat exchange, the slop of line AW or AW' is less steep than that of AC or PQ, that is, the increase in ammonia content is achieved with a smaller rise in temperature. Reaction is now continued with sufficiently intense cooling to remove heat at least as fast as it is generated, so that the temperature falls at the same time as the ammonia content increases. The temperature should ideally be maintained at the maximum rate level, that is, the line should proceed directly to point Y or even further to the right along the maximum rate line. However, the temperature may be above or (as shown) below the maximum rate line, provided it does not fall below the strike temperature of the catalyst. How far the temperature is allowed to fall is generally dictated by the need to avoid excessive expense in constructing the reactor and cooling system. When sufficient reaction has taken place in the second stage, the mixture is fed into an adiabatic bed, and there it reacts with the same approximately linear increase of temperature with ammonia content that was noted in other adiabatic stages. The adiabatic bed is sufficiently large to effect reaction beyond the maximum rate composition and well towards equilibrium (point Z).

If the cooling is such that the first stage of reaction reaches a higher temperature, that is, is prepresented by line AW', subsequent reaction will proceed via X' and Y' to Z' and the ammonia concentration will be higher.

Figure 2:
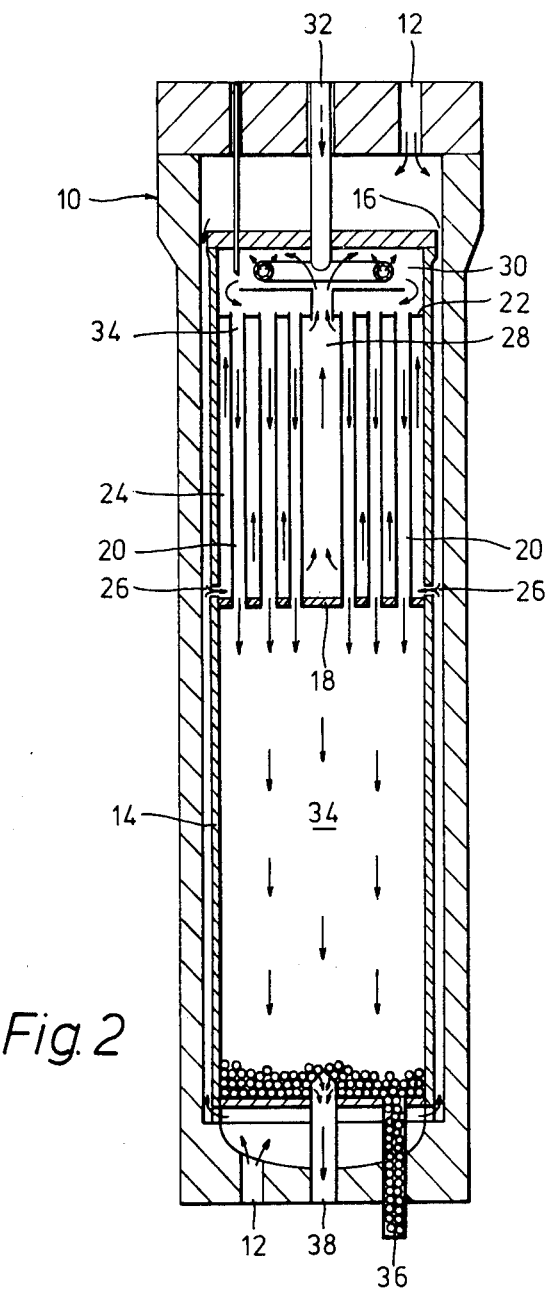
FIG. 2 shows in axial section a reactor for use in the process.

A preferred reactor according to the invention (see FIG. 2) comprises an outer shell 10, with lid, including gas inlet 12 and other apertures that will be referred to later. Inside shell 10 is supported cartridge 14, which has insulated walls and lid and is positioned to provide an annular-section gas-space 16 between itself and shell 10. Cartridge 14 is divided into two parts by tube-plate 18, which supports the lower ends of tubes 20, the upper ends of which are supported by tube-plate 22. (In the reactor as shown, tube-plate 22 is of light construction. In an alternative reactor in which an adiabatic catalyst bed is to be used above tubes 20, tube-plate 22 is of heavier construction in order to support the weight of the catalyst). Space 24 outside tubes 20 has gas inlets 26 fed from space 16 and thus from inlets 12. The gas outlet from space 24 is central, at 28, into space 30, which contains a sparger fed from by-pass gas feed 32. In operation, tubes 20 are filled with catalyst particles 34, which also fill the lower portion of cartridge 14; catalyst is charged to the reactor by removing the lids of the shell and cartridge, and is discharged at 36. The gas outlet from the reactor is at 38.

Figure 3:
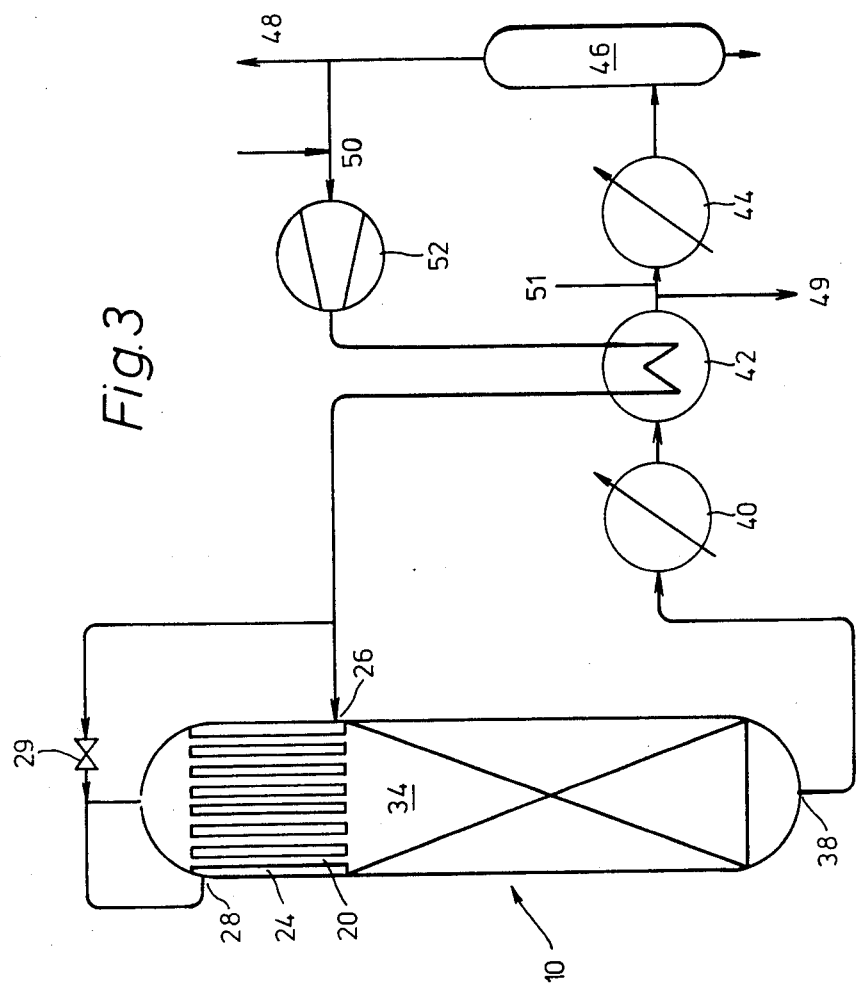
FIG. 3 shows an ammonia synthesis plant according to the invention.

The synthesis plant represented by FIG. 3 comprises reactor 10 having a catalyst bed in two parts, the upstream part being in tubes 20 and the lower part being adiabatic bed 34. For simplicity the gas flow around the cartridge has not been shown, and the mixing chamber above the tubes 20 has been represented schematically by external connections. Synthesis gas enters at 26 the space 24 outside tubes 20, leaves space 24 at 28 and mixes with a by-pass gas flow controlled by valve 29 and enters tubes 20, which contain catalyst. If desired, gas can be controllably fed at other points in order to control the temperature of the gas in space 24 and thereby that of the reacting gas in tubes 20. The gas passes out of tubes 20 and enters adiabatic bed 34, in which it reacts almost completely. It then leaves the reactor at 38, passes through high pressure waste heat boiler 40, preheater 42 and final cooler 44 and enters separator 46, from which condensed ammonia is run off at the bottom and unreacted gas is taken off overhead. The unreacted gas is in a minor proportion purged at 48, but the major portion is mixed at 50 with fresh synthesis gas from a generation section. The purge at 48 and gas feed at 50 are to be used when the gas has been purified by liquid nitrogen washing; if purification is by methanation the purge is preferably at 49 and gas inlet at 51. The mixed gas is compressed in circulator 52, preheated in 42 and fed to the reactor at 26 and possibly, if required via valve 29.

EXAMPLE

An ammonia synthesis plant producing 1000 metric tons of ammonia per day and using the flowsheet shown in FIG. 3 is operated at 220 atm. abs. catalyst outlet pressure and with steam generation in boiler 40 at a pressure of 108 atm. abs. and a rate of 0.9 to 1.3 metric tons per metric ton of ammonia. The steam is let-down in a pass-out turbine driving the synthesis gas compressor and circulator 52. Two ways of using such a process are envisaged; by way of example, using a reactor in which 59% of the catalyst volume is in the tubes and 41% is in the adiabatic bed:

A. with strong cooling at 44, low ammonia content in the feed to the catalyst and low gas circulation rate; and B. with moderate cooling at 44, relatively high ammonia content in the feed to the catalyst and high gas circulation rate.

These two ways are made possible by the high conversion to ammonia that result from the indirect heat exchange in the cooled zone and the large catalyst volume in the adiabatic zone. It will be appreciated that in A the low circulation rate uses less power but that power is used in refrigeration machinery to achieve the strong cooling. Conversely, whereas power is not used in B for refrigeration at 44, more power is used in circulating the gas and in cooling the product ammonia to the temperature at which it can be stored at atmospheric pressure. The Table shows a comparison of processes A and B with a process (C) using a quench-cooled reactor. It is evident that process A provides a higher ammonia content in the product gas with substantially lower power consumption for circulation and refrigeration, and that process B makes operation possible without refrigeration of circulating gas.

TABLE

| Process | A | B | C |
|---|---|---|---|
| Gas fed to catalyst composition | | | |
| % v/v H$_2$ | 72.0 | 66.75 | 72.0 |
| N$_2$ | 24.0 | 22.25 | 24.0 |
| CH$_4$ | 0.2 | 0.2 | 0.2 |
| A | 0.8 | 0.8 | 0.8 |
| NH$_3$ | 3.0 | 10.0 | 3.0 |
| flow rate $\overline{K}$ M$^3$ h$^{-1}$ | 369686 | 520833 | 520000 |
| Temperature °C. | | | |
| Inlet catalyst in tubes 20 | 420 | 400 | — |
| Outlet catalyst in tubes 20 | 400 | 400 | — |
| Inlet bed 34 | 400 | 400 | — |
| Outlet bed 34 | 459 | 451 | — |
| Cooling at 44 | −6 | 32 | −6 |
| Ammonia in reacted gas % v/v | 22.5 | 24.0 | 16.2 |
| Steam output at 40, te/te NH$_3$ | 1.13 | 1.57 | — |
| Circulation power, MW | 0.6 | 1.7 | 1.7 |

TABLE-continued

| Process | A | B | C |
|---|---|---|---|
| Refrigeration power at 44, MW | 1.84 | 0 | 2.68 |
| Refrigeration power for storage, MW | 0.82 | 2.0 | 0.82 |
| Total variable power | 3.26 | 3.70 | 4.10 |

We claim:

1. A process for carrying out the gas phase catalytic synthesis of ammonia utilizing a reactor having a first catalyst zone within a plurality of tubes around which there is a coolant circulation space, and having immediately downstream of that first catalyst zone an adiabatic catalyst zone; said process comprising the step of:
   (a) disposing an ammonia synthesis catalyst in the reactor first catalyst zone;
   (b) passing a gas mixture containing nitrogen and hydrogen and residual ammonia through the reactor coolant circulation space so as to heat the gas to a temperature in the range 350°–430° C.;
   (c) passing the thus heated gas through the first zone, reacting it therein to produce ammonia, and controlling the rate of feed of the gas mixture containing nitrogen and hydrogen through the space so that the temperature in the first zone (i) rises to a temperature which is 540°–580° C. when the residual ammonia content is 3% v/v, 400°–450° C. when the residual ammonia content is 20% and at corresponding interpolated levels between these residual ammonia contents and (ii) falls as that the reacted gas leaves the said first zone at under 400° C.;
   (d) passing the effluent of the first catalyst zone into the adiabatic catalyst zone and reacting it therein so as to produce further ammonia and increase the temperature to 420°–480° C.; and
   (e) passing the effluent of the said adiabatic zone, without any further catalytic ammonia synthesis or heat exchange, through a high grade heat recovery zone affording an external heat recovery of steam at a pressure over 30 atm. abs.

2. A process as recited in claims 1 comprising the further step of passing the gas, after the high grade external heat recovery, in heat exchanging relationship with gas to be used as coolant for the first catalyst zone.

3. A process as recited in claims 1 wherein the reactor contains an adiabatic pre-zone before the first catalyst zone, and comprising the further step of, prior to step (b), feeding the nitrogen-hydrogen gas mixture at the lowest temperature at which the catalyst is active to the adiabatic pre-zone so as to produce a substantial rise in temperature just before passing the gas mixture into the reactor first catalyst zone.

4. A process for carrying out the gas phase catalytic synthesis of ammonia utilizing a reactor having a first catalyst zone within a plurality of tubes around which there is a coolant circulation space, and having immediately downstream of that first catalyst zone an adiabatic catalyst zone; said process comprising the step of:
   (a) disposing an ammonia synthesis catalyst in the reactor first catalyst zone;
   (b) passing a gas mixture containing nitrogen and hydrogen and residual ammonia through the reactor coolant circulation space so as to heat the gas to a temperature in the range 350°–430° C.;
   (c) passing the thus heated gas through the first zone, reacting it therein to produce ammonia, and controlling the rate of feed of the gas mixture containing nitrogen and hydrogen through the space so that the temperature in the first zone (i) rises to a temperature which is 540°–580° C. when the residual ammonia content is 3% v/v, 400°–450° C. when the residual ammonia content is 20% and at corresponding interpolated levels between these residual ammonia contents and (ii) falls as that the reacted gas leaves the said first zone at under 400° C.;

(d) passing the effluent of the first catalyst zone into the adiabatic catalyst zone and reacting it therein so as to produce further ammonia and increase the temperature to 420°–480° C.; and (e) passing the effluent of the said adiabatic zone, without any further catalytic ammonia synthesis or heat exchange, through a high grade heat recovery zone affording an external heat recovery of hot pressurized boiler feed water.

5. A process as recited in claim 4 comprising the further step of passing the gas, after the high grade external heat recovery, in heat exchanging relationship with gas to be used as coolant for the first catalyst zone.

6. A process as recited in claim 4 wherein the reactor contains an adiabatic pre-zone before the first catalyst zone, and comprising the further step of, prior to step (b), feeding the nitrogen-hydrogen gas mixture at the lowest temperature which the catalyst is active to the adiabatic pre-zone so as to produce a substantial rise in temperature just before passing the gas mixture into the reactor first catalyst zone.

* * * * *